UNITED STATES PATENT OFFICE.

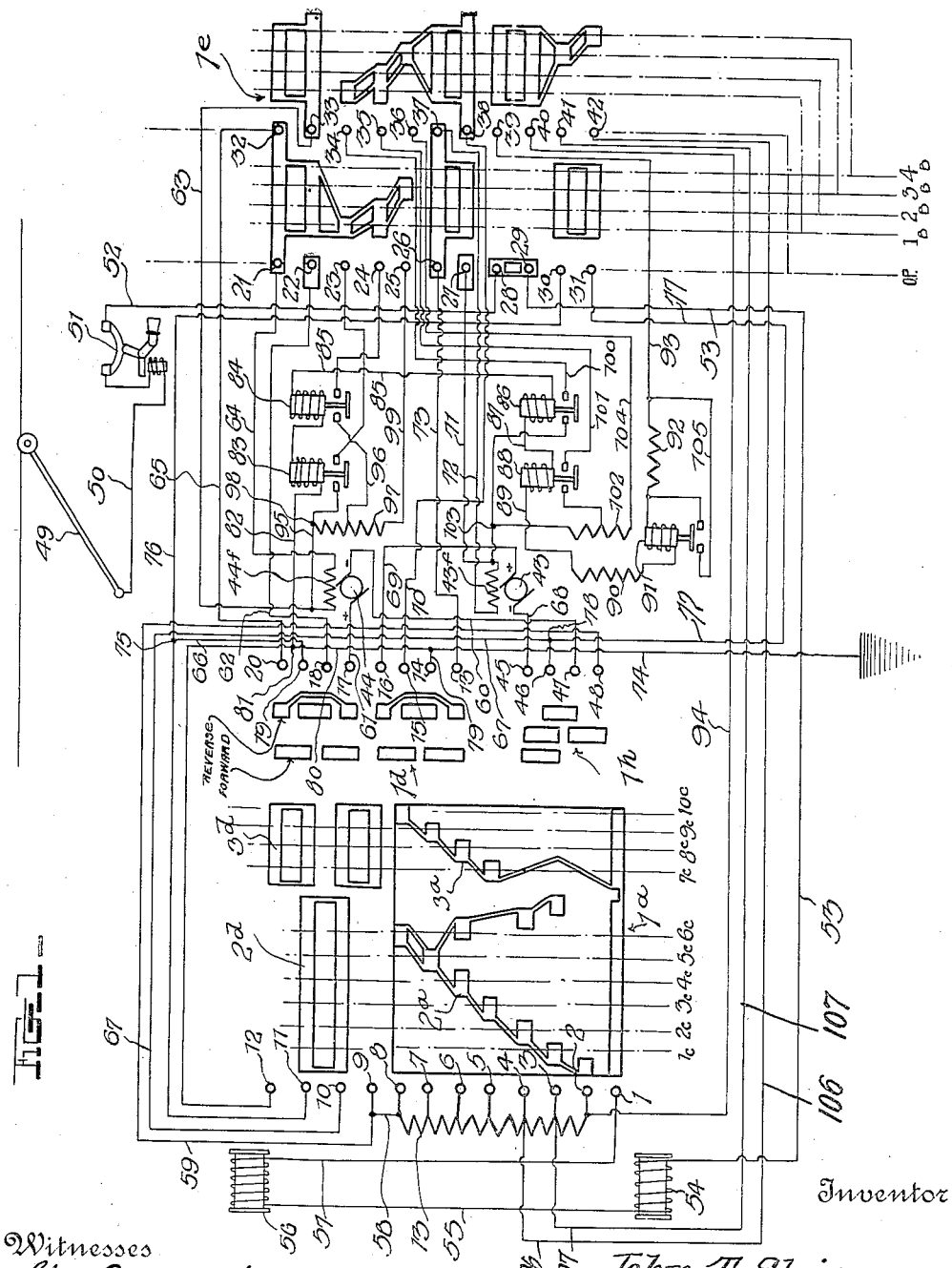

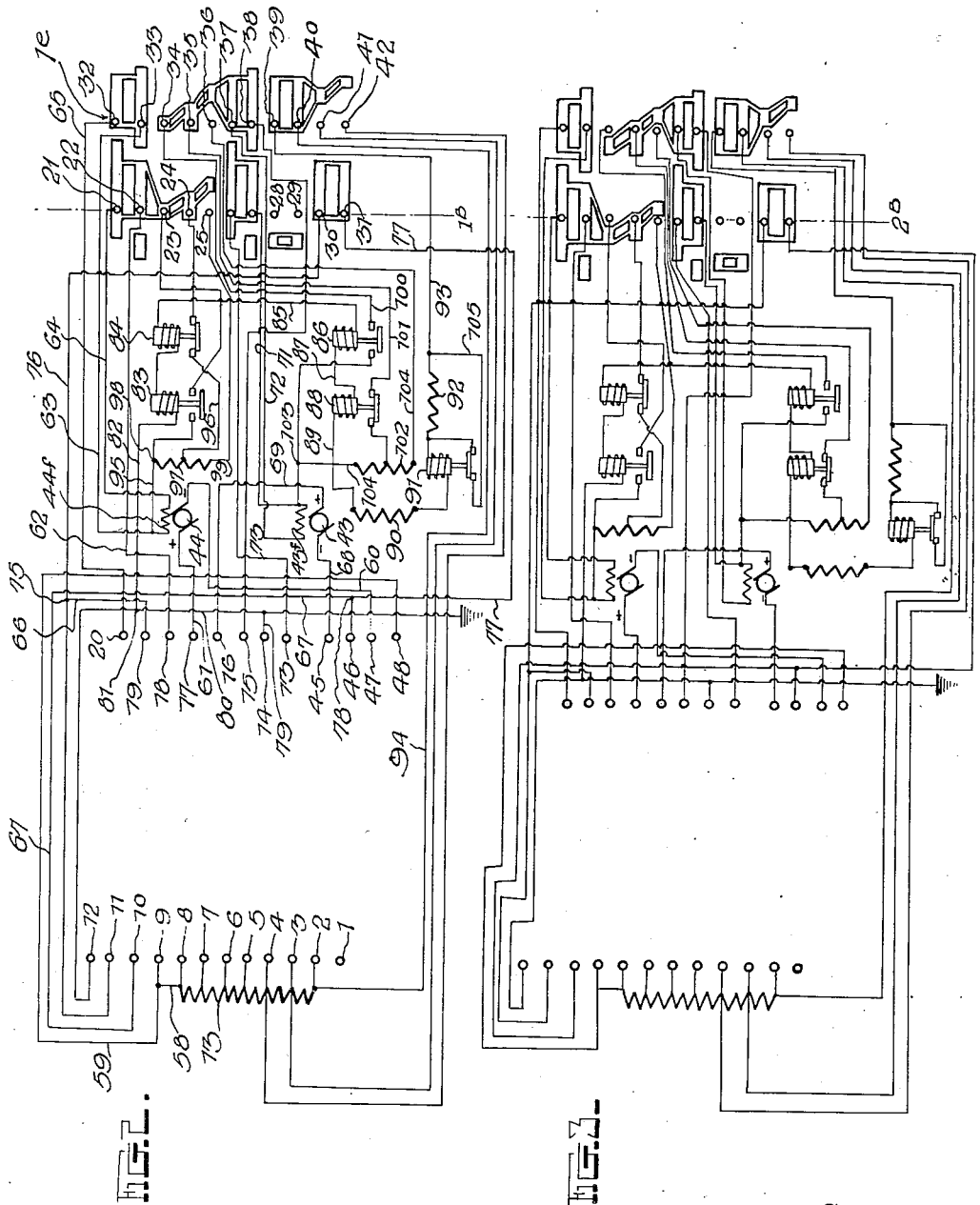

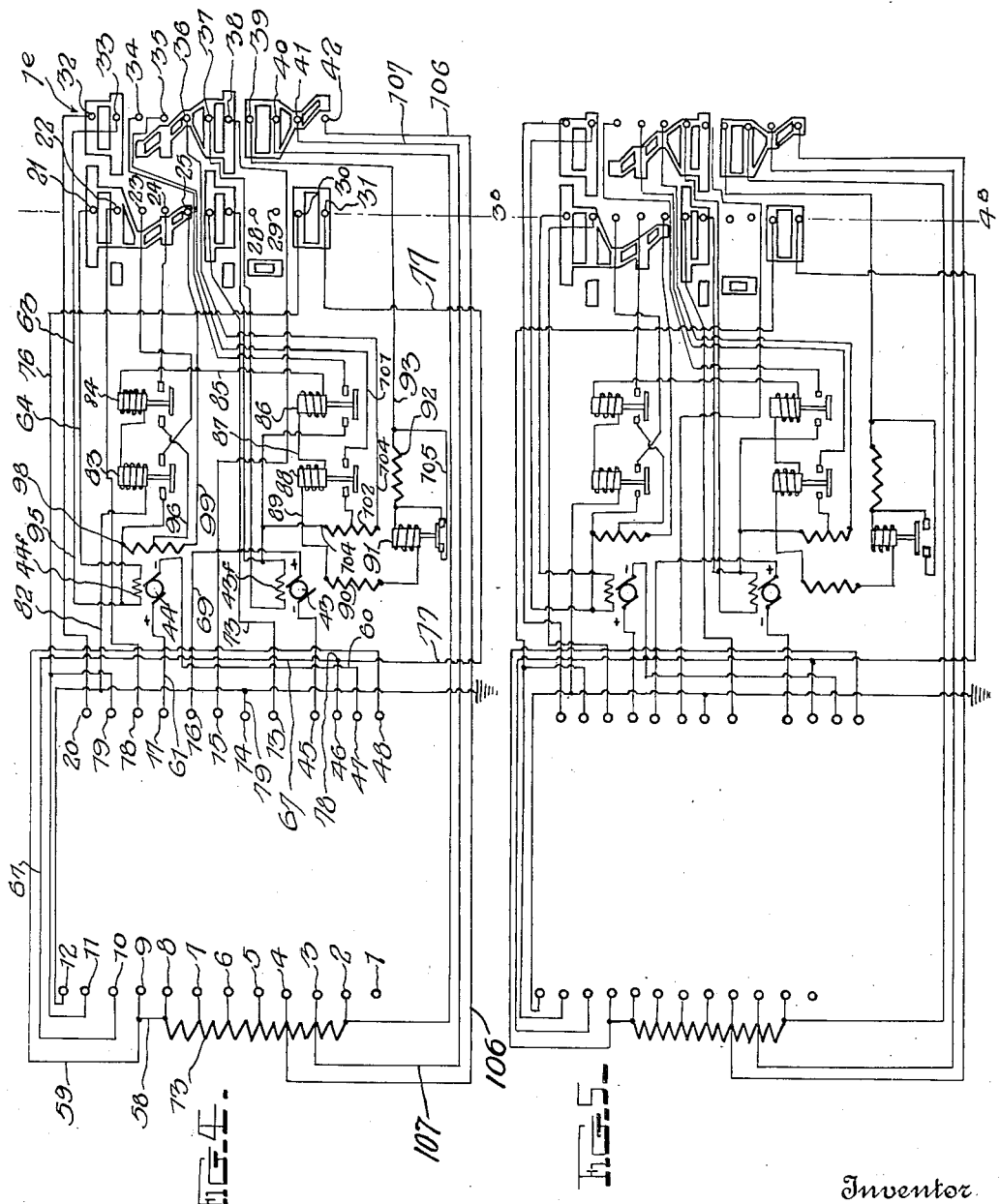

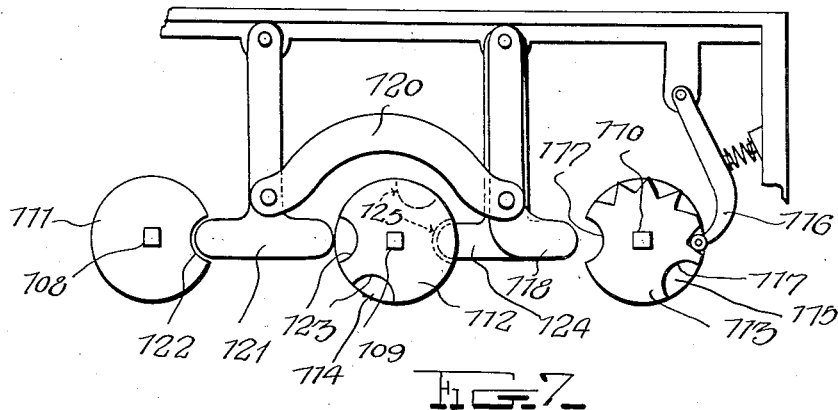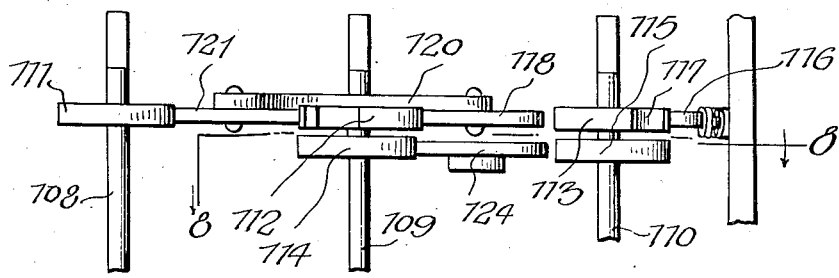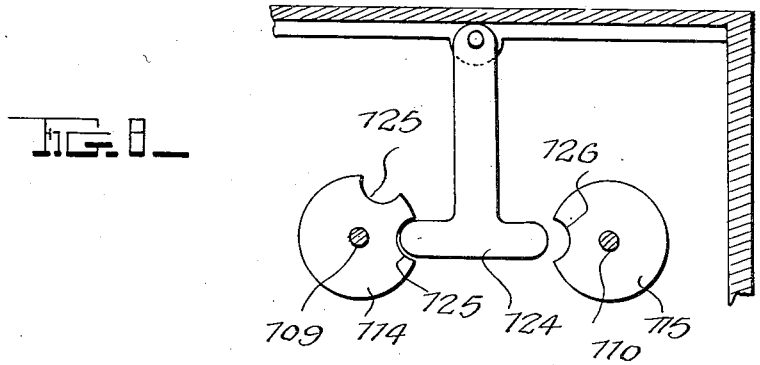

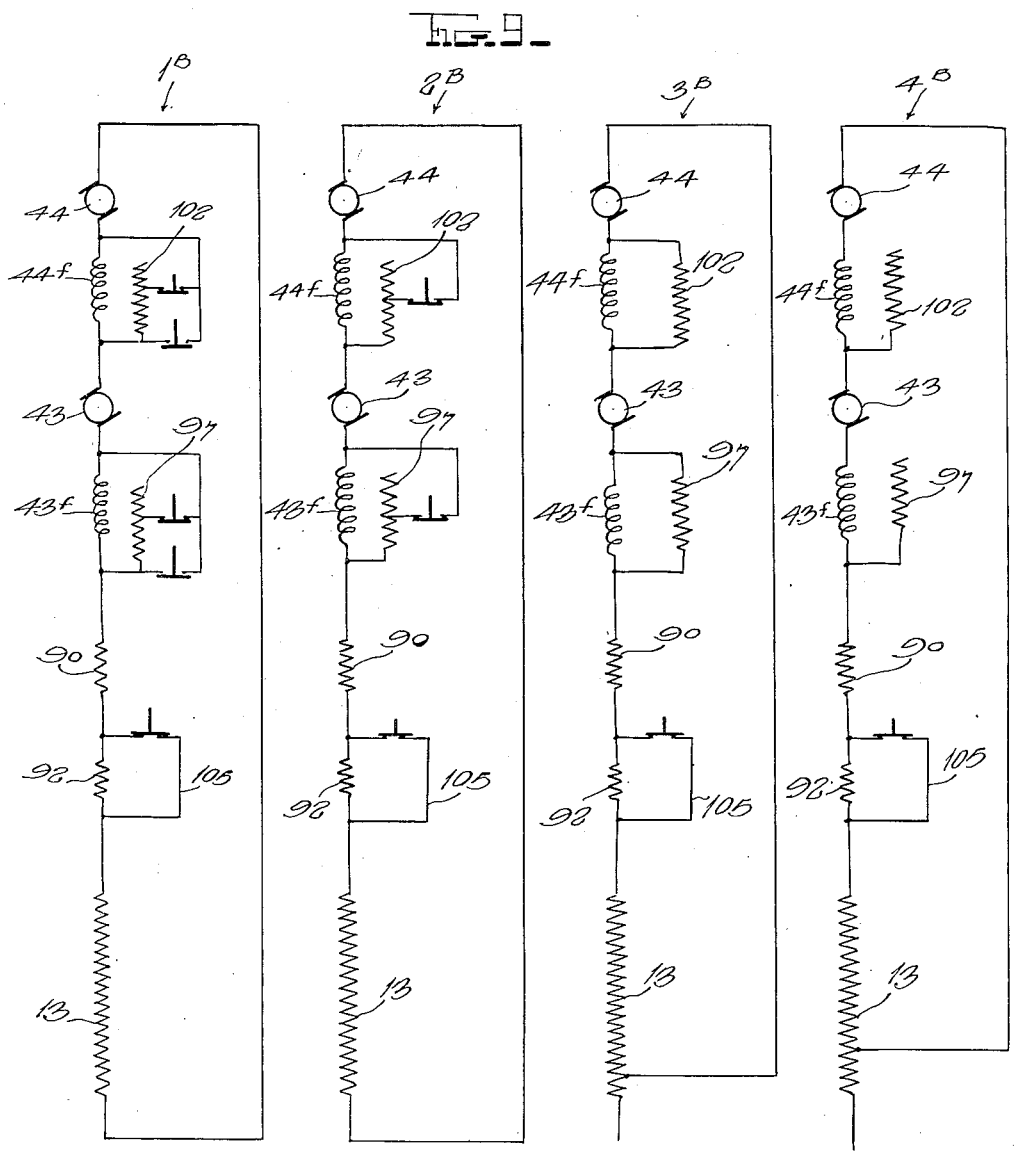

JOHN T. SKINNER, OF LAWRENCE, KANSAS.

ELECTRIC BRAKING SYSTEM.

1,230,935.   Specification of Letters Patent.   Patented June 26, 1917.

Application filed May 17, 1915. Serial No. 28,753.

*To all whom it may concern:*

Be it known that I, JOHN T. SKINNER, a citizen of the United States, residing at Lawrence, in the county of Douglas and State of Kansas, have invented certain new and useful Improvements in Electric Braking Systems; and I do declare the following to be a full, clear, and exact description of the invention, such as will enable others skilled in the art to which it appertains to make and use the same.

This invention relates to a system of electro dynamic control for motor propelled vehicles and one object of the same is to provide a means wherein the motors utilized for propelling a vehicle may be operated as such or connected as generators, in which case the latter are operated by the momentum of the moving vehicle to act as a braking means for the same when said vehicle is descending a grade, or whenever desired.

Another and further object of my invention is to provide a braking controller adapted to act in conjunction with a running controller, through the instrumentality of which a shunt path may be established across the series fields of the respective motors.

Another and still further object of this invention is the provision of a braking controller which will enable more or less resistance to be included in a shunt path across the series fields of the respective motors when the latter are operating as generators, the amount of resistance included in said shunt paths being determined by the rapidity with which the respective generators build up.

Another object of this invention is to provide a braking controller of standard parts which may be readily and easily connected to a standard series parallel operating or running controller.

Another and further object resides in providing an electro dynamic control system which may be readily installed and one which will eliminate many of the disadvantages and annoyances associated with similar systems now in use.

With these and other objects in view, my invention consists of certain novel details of construction, combination and arrangement of parts as will be more particularly hereinafter set forth and claimed.

In the accompanying drawings in which similar parts are represented by corresponding reference characters.

Figure 1 is a diagrammatic development of the various controllers involved in my invention and the circuits therefor, all the controllers being shown in off position;

Fig. 2 is a diagrammatic development of the braking controller and circuits established thereby when the latter is in position $1^b$; the running and reversing controllers being omitted;

Fig. 3 is a similar view when the braking controller is in position $2^b$;

Fig. 4 is a similar view when the braking controller is in position $3^b$;

Fig. 5 is a similar view when the braking controller is in position $4^b$;

Fig. 6 is a top plan view of my improved locking mechanism;

Fig. 7 is a side elevation thereof;

Fig. 8 is a horizontal section taken on the line 8—8 of Fig. 7; and

Fig. 9 is a simplified diagrammatic view of the braking circuit corresponding to the four positions of the braking controller.

Briefly stated, my invention consists of a standard series parallel running controller for controlling the operation of a plurality of motors and an interconnected braking controller by means of which the motors may be disconnected from the source of electric supply and connected to operate as generators, the latter being propelled by the movement of the vehicle, said braking controller at the time of interconnecting the motors to operate as generators, also permitting the establishment of shunt paths across the series fields of the respective motors, said fields including more or less resistance, dependent on the speed at which the vehicle is traveling. In this connection it is here pointed out that certain of the shunt paths across the fields of the various motors are also controlled by certain automatic means operating in conjunction with the movable contacts on the braking drum, as will be readily seen by referring to Fig. 1 of the drawings.

In its present illustrated embodiment, my invention consists of a main running or operating cylinder, a reversing cylinder, a braking controller, and an auxiliary switch by means of which both motors may be employed or said motors operated singly as desired. These controllers which are shown developed in Fig. 1 of the drawings are of standard construction and adapted to be disposed in a suitably mounted casing. The particular manner of mounting the cylinders under consideration will be hereinafter more particularly pointed out.

The main cylinder 1ª of the controller has the usual movable contacts and the coöperating stationary contacts 1, 2, 3, 4, 5, 6, 7, 8, 9, 10, 11 and 12. The usual resistance coil 13 is connected at various points thereon to the stationary contacts 2 to 8 inclusive. This main operating cylinder has ten positions indicated by the reference characters 1ᶜ, 2ᶜ, 3ᶜ, 4ᶜ, 5ᶜ, 6ᶜ, 7ᶜ, 8ᶜ, 9ᶜ and 10ᶜ.

The reversing cylinder 1ᵈ of the running controller is provided with stationary contacts 13, 14, 15, 16, 17, 18, 19 and 20.

The braking controller 1ᵉ is provided with standard movable contacts 2ᵈ and 3ᵈ adapted to coöperate with a double row of stationary contacts, those of one row being indicated by the reference numerals 21, 22, 23, 24, 25, 26, 27, 28, 29, 30 and 31; those of the opposite row being indicated by the reference numerals 32, 33, 34, 35, 36, 37, 38, 39, 40, 41 and 42. This braking controller has four positions indicated on the drawings by the reference characters 1ᵇ, 2ᵇ, 3ᵇ and 4ᵇ. The running controller controls the two motors 43 and 44. However, in order that said motors may be operated either singly or in pairs, there is provided an auxiliary switch 1ʰ having movable contacts for coöperation with the stationary contacts 45, 46, 47 and 48. This auxiliary switch has three positions as clearly shown in Fig. 1 of the drawings where its development is shown.

In order that the motors 43 and 44 may be supplied with electrical energy by the running controller when the braking controller is in off position, a trolley 49 is connected by a conductor 50 to one terminal of a circuit breaker 51, the other terminal thereof being connected by a conductor 52 to contact 28 on the braking controller. Now since this controller is in off position, the movable contacts thereon will bridge stationary contacts 28 and 29 so that current may flow from the former to the latter. Contact 29 is connected by a conductor 53 to one terminal of a blow out coil 54. The other terminal of this coil is connected by a conductor 55 to one terminal of another blow out coil 56. The remaining terminal of this coil is connected by a conductor 57 to stationary contact 1 of the main controlling cylinder 1ª, and if this cylinder is in first running position, to wit, 1ᶜ, said current will pass by means of the movable contacts on the cylinder to stationary contact 3, from whence it will flow through the rheostat resistance 13 to stationary contact 8, thence through conductor 58 which connects this contact with contact 9. From stationary contact 9 the current will pass through conductor 59 to the stationary contact 48 of the auxiliary switch. Presuming the auxiliary switch to be in a position to connect both of the motors 43 and 44, since stationary contacts 48 and 47 are bridged by the movable contact of the auxiliary switch, the current will pass from said contact 48 to contact 47, thence to one brush of motor 44, via the conductor 60, through the armature winding of the latter and conductor 61, to stationary contact 17 of the reverse cylinder. As this cylinder will be considered in forward position, stationary contacts 17 and 18 will be bridged by the movable contact of the cylinder. Passing from stationary contact 18, the current will flow through conductor 62 to stationary contact 22 of the braking controller, thence through the movable contact thereof to stationary contact 33, from the latter through conductor 63 to one terminal of the field 44ᶠ of motor 44, from the opposite terminal of the field through conductor 64 to stationary contact 21 of the braking controller, thence through the movable contact thereof to stationary contact 32, from whence it passes through conductor 65 to stationary contact 20 of the reverse cylinder, through the movable contact thereof to stationary contact 19, thence through conductor 66 to stationary contact 11 of the main operating controller. As stationary contacts 10 and 11 are bridged by the movable contacts on said main operating controller, the current will pass from contact 11 to contact 10 and through conductor 67 to stationary contact 46 of the auxiliary switch, through the movable contact thereon to stationary contact 45, through conductor 68 to one brush of motor 43, through the armature winding thereof and conductor 69 to stationary contact 16 of the reverse cylinder, through its movable contact to stationary contact 15, thence through conductor 70 to stationary contact 38 on the braking controller, over movable contact which bridges stationary contacts 38 and 27, from whence it passes through conductor 71 to one terminal of field 43ᶠ of motor 43, through said field and conductor 72 to stationary contact 37 of the braking controller, through the movable contact thereon, bridging stationary contacts 37 and 26 respectively and conductor 73 to stationary contact 13 of the reversing cylinder. Passing through the movable contact of the reversing cylinder to stationary contact 14, the current passes from the latter via the conductor 74 to ground.

From the above it will be obvious that when the braking controller is in off position, and it is here noted that such position is its normal one, the running controller may be operated as usual for controlling the various motors. Although I have set forth but one position of the running controller, it is to be understood that the various intermediate positions may be obtained by simply advancing the running controller handle in a clockwise direction until point $10^c$ is reached. Moreover, referring to the drawings it will be observed that at point $7^c$, the motors will be connected in multiple through the instrumentality of movable contacts $3^d$. However, as the controller utilized is one of standard construction, it is thought unnecessary to refer further to the same.

When it is desired to use the braking controller, the running controller is turned to off position which, it will be observed, disconnects the trolley circuit from all of the contacts on the main operating cylinder $1^a$ of the running controller. Now presuming that the braking controller is advanced one point in a clockwise direction; that is, to position $1^b$, see Fig. 2, it will be seen that the control circuit will be broken at the stationary contacts 28 and 29 of the braking controller, also the connection of the fields $44^f$ and $43^f$ of motors 44 and 43 will be broken at 32 and 22, and at 27 and 37 respectively.

As the armatures of the respective motors are rotated by the momentum of the moving vehicle, the current will flow from the negative brush of motor 44 via conductor 61 to stationary contact 17 of the reverse cylinder $1^d$, and since the latter is in a forward position, said current will pass to stationary contact 18, thence through conductor 62 to stationary contact 22 of the braking controller. As advancing the braking controller to point $1^b$ disconnected the stationary contacts 22 and 33, and connected stationary contact 22 with stationary contact 21, the current will pass from the latter through conductor 64 to one terminal of field $44^f$, thence through the same and conductor 63 to stationary contact 33. Now as the stationary contact 33 is in the meantime connected to stationary contact 32, said current will flow from contact 33 through conductor 65 to stationary contact 20 of the reversing cylinder $1^d$, through the movable contact thereof to stationary contact 19, thence through conductor 66 to point 75 from whence it passes via conductor 76 to stationary contact 30 of the braking controller and from the same to stationary contact 31 inasmuch as these two contacts are now bridged by the movable contact of the controller. From stationary contact 31, the current passes via conductor 77 to point 78 on conductor 67. From point 78, the current passes to stationary contact 46 of the auxiliary switch, through the movable contact thereon to stationary contact 45, thence through the conductor 68 to positive brush motor 43, through the armature winding thereof to the negative brush, from whence it passes via conductor 69 to the stationary contact 16 of the reversing cylinder, through the movable contact thereon to stationary contact 15, and thence through conductor 70 to stationary contact 38 of the braking controller. As the movable contacts now place stationary contacts 38 and 37 in connection, said current will pass to the latter and thence through conductor 72 to one terminal of the field winding $43^f$ of motor 43, through said field winding and conductor 71 to stationary contact 27 of the braking controller, from whence it passes by means of the movable contacts on said controller to stationary contact 26, thence through conductor 73 to stationary contact 13 on the reversing cylinder of the running controller. From stationary contact 13, the current passes through the movable contact to stationary contact 14, thence through conductor 79 to conductor 74 and to point 81. To this point is also connected the free extremity of conductor 82 which extends from the stationary contact 12 of the main operating cylinder. From the point 81, via conductor 82, the current passes to one terminal of an electromagnet 83, thence through conductor 82 to one terminal of electromagnet 84, from the other terminal thereof via conductor 85 to electromagnet 86, from which it passes via conductor 87 to electromagnet 88, thence through conductor 89 to the resistance coil 90, through said resistance coil to one terminal of electromagnet 91, from the other terminal thereof, passes through resistance coil 92 or shunt path 105 and conductor 93 to stationary contact 39 of the braking controller. As moving the latter to point $1^b$ has brought the movable contacts of the controller into engagement with the stationary contacts 39 and 40, said current will pass from the latter contact through conductor 94 to the stationary contact 2 of the main operating cylinder of the running controller. As this controller is in an off position, the current will pass through all of the resistance 13 to stationary contact 9, from whence it will pass via conductor 59 to stationary contact 48 of the auxiliary switch, through the movable contact thereof to stationary contact 47, and thence through conductor 60 to the positive pole of motor 44.

From the above it will be thus seen that when the braking controller is moved to the position $1^b$, the field connections of the respective motors will be reversed and said motors connected to operate as generators.

To prevent too rapid rise of the current, there is provided a shunt path across the fields $43^f$ and $44^f$ of the motors 43 and 44 respectively in the manner hereinafter to be set forth.

The electromagnet 83 has an armature adapted to close a break in a conductor 95 which extends from one extremity of the field $44^f$ to stationary contact 23, while the electromagnet 84 controls an armature adapted to close a break in a conductor 96, one end of which is connected to the central portion of resistance 97, the other extremity to stationary contact 24. The resistance coil 97 has one extremity connected to point 98 on conductor 95, and its other extremity connected to one end of conductor 99, the free end of which is secured to stationary contact 25.

The electromagnet 86 controls an armature adapted to close a break in the conductor 100, one end of which conductor is connected to one terminal of the field 43$^f$ of motor 43, the other terminal of the other extremity being connected to the stationary contact 34. On the other hand, the electromagnet 88 controls an armature adapted to close a break in the conductor 101, one extremity of which is connected to the central portion of the resistance 102, the other extremity of said conductor being connected to stationary contact 35. The resistance coil 102 has one end connected to conductor 100 at point 103. The free extremity of resistance coil 102 is connected by a conductor 104 to stationary contact 36 of the braking controller.

The armature of electromagnet 91 under normal conditions bridges a break in conductor 105 to provide a shunt circuit around resistance 92, the extremities of conductor 105 being connected to those of 92.

From the above connections it will be apparent that when the braking controller is moved to position 1$^b$, should the motor 44 build up too rapidly, the electromagnetic switch 84 will be energized so as to close the shunt circuit extending from one extremity of the field winding 44$^f$ through conductor 95, thence through a portion of resistance 97, through the conductor 96, the break therein being closed by electromagnet 84, to stationary contact 24, thence through the interconnected movable contacts of the braking controller, to stationary contact 21, from whence it will pass through conductor 64 to the opposite extremity of the field 44$^f$. Inasmuch as the electromagnets 84 and 88 are wound so as to act simultaneously, a circuit will also be formed extending from one terminal of the field 43$^f$ of motor 43, through the conductor 104, a portion of resistance 102, thence through conductor 101, the break therein being closed, to stationary contact 35, from whence it will pass, by means of the interconnected movable contacts on the braking controller to point 37, and thence through conductor 72 to the opposite extremity of the field 43$^f$. Thus there will be formed across the field of each motor a shunt path having therein the same amount of resistance. If, however, the speed of the vehicle is such that the current continues to rise, the electromagnet 83 will be energized so as to actuate its armature and close the break in conductor 95 so that current may pass from one terminal of the field 44$^f$ of motor 44 to stationary contact 23, thence through the interconnected contacts of the braking controller to stationary contact 21, from whence it passes through conductor 64 to the opposite extremity of the field 44$^f$, thus making a direct shunt of very low resistance across the field of motor 44. To provide a similar shunt across the field 43$^f$ of motor 43, the electromagnet 86 which acts in unison with electromagnet 83 closes the break in conductor 100 so that the current may pass from one terminal of the series field 43$^f$ to stationary contact 34 of the breaking controller through the movable interconnected contacts to stationary contact 37, from whence it passes via conductor 72 to the opposite terminal of said field 43$^f$. In this connection, it is to be noted, however, that should the current be insufficient to energize the electromagnets hereinbefore referred to, the current through the field will take its usual course as shown diagrammatically in Fig. 5 of the drawings.

When the breaking controller is moved to the point 2$^b$, if the vehicle is not moving very rapidly, the current will, as before stated, take its normal course through the series fields of the respective motors. However, in the case of the electromagnets 84 and 88, which as above stated, operate simultaneously, are energized, then a shunt path across the fields 43$^f$ and 44$^f$ of the motors 43 and 44 respectively will be formed, said path including a portion of the resistance coils 97 and 102 respectively. Moreover, it will also be observed that when the breaking controller is in position 2$^b$, it will be impossible for the same to form a direct shunt across the series fields of the two motors as in position 1$^b$, as shown clearly in Fig. 3 of the drawings.

When the braking controller is moved to position 3$^b$, a shunt path will be formed across the fields 43$^f$ and 44$^f$ of motors 43 and 44 respectively, said path including all of the resistance 97 and 102 as clearly shown in Fig. 4. The controller being in position 3$^b$ prevents formation of any of the other shunt paths across the fields of the respective motors, as will be readily understood without further description.

After the braking controller has been moved to position 4$^b$, the various shunt path circuits across the fields 43$^f$ and 44$^f$ respectively will be disconnected so that all of the current generated must flow through the said fields. However, when the braking controller is in the position last stated, the current will pass over conductor 93 to stationary contact 39, thence to 42 on the braking controller, (unless an excess current is generated, so that electromagnet 91 opens the circuit shunting resistance 92 and inserts this resistance in conductor 93 leading to stationary contact 39), from whence it passes via conductor 106 to stationary contact 4 of the main operating cylinder, thus cutting out a portion of resistance 13. It is also to be noted at this point that when the braking controller is in position 3$^b$ the current is permitted to pass from stationary contact 39 of the braking controller to stationary contact 41 by means of the interconnected movable contacts. From the stationary contact 41, the current passes over the conductor 107 to stationary contact 3 of the main operating cylinder, thus cutting out a portion of resistance 13 equal to about one-half of that cut out when the braking controller is in position 4$^b$.

Although I have shown and described but three shunt paths across the series fields of the respective motors; nevertheless, it is to be understood that other shunt paths may be added giving additional graduations to the resistance 97. Moreover the same may be said with respect to resistance 102. In other words, instead of shunting the entire resistances as illustrated and described, said resistances may be placed in circuit section by section as will be readily understood.

When the braking controller is in position 4$^b$, it will be seen that all shunts across the motor series field are disconnected and that the motors are in the same relative position as if the reversing cylinder had been moved to a reverse position, and if the circuit breaker is open, the main operating cylinder of the running controller may be moved around to parallel position to accomplish what is known as bucking the motors for an emergency stop. If excessive current is generated the electromagnet 91 opens the circuit shunting the resistance 92 and inserts this resistance in conductor 93 leading to contact 39, as will be perceived upon referring to Fig. 1 of the drawings. This forms an additional protection to the motors against excessive current and is free to act at any time during the operation of the braking controller.

When required, additional controller points may be added to the braking controller for varying the series resistance to operate a more gradual braking application for coasting down grades or assisting in stopping, as the case might be, all of which will be readily understood without further description.

While I have shown my improved braking system in connection with a series parallel running controller and a two motor equipment, I do not wish to limit myself to the same, inasmuch as any number of motors might be employed, and also a different style of running controller, as will be understood without further description.

In order to maintain the braking controller and the reversing cylinder in a fixed position while the main cylinder of the running controller is being operated and also to retain the main and reversing cylinders of the running controller in a fixed position while the braking controller is being operated, I provide an interlocking mechanism hereinafter to be set forth.

Each of the operating shafts 108, 109, and 110, Figs. 6, 7 and 8, respectively of the three cylinders are provided with notched plates 111, 112 and 113. In addition to plates 112 and 113 respectively, the shafts 109 and 110 are provided with notched plates 114 and 115 which plates are disposed immediately below the main plates for a purpose hereinafter to be set forth.

For coöperation with a spring pressed latch 116 which is pivotally connected to the casing in which the different cylinders are mounted, the upper plate 113 on shaft 110 is provided with a series of notches corresponding to the four points of the braking controller. In addition to the aforesaid notches, the plate 113 is also provided with additional notches 117 adapted to coöperate with the laterally projecting end of latch 118 which is pivotally mounted on the casing of the various cylinders. This latch 118 is connected by a cross bar 120 to a T-shaped latch 121, one extremity of the T-head of this latch being adapted to project into a notch 122 formed in the plate 111 on shaft 108 of the main operating cylinder, the other extremity being adapted to coöperate with notches 123 formed in the upper plate 112 on shaft 109.

Pivotally mounted on the casing immediately below and in alinement with the latch 118 is an additional T-shaped latch 124, one extremity of the T head of said latch being adapted to coöperate with a notch 126 of the lower plate 115 on shaft 110 of the braking controller.

From the above structure when the main operating cylinder is actuated, the latch 121 will be forced to the right and the extremity of the T head forced into one of the notches 123 of the reversing cylinder, dependent on the position of the latter which will thus lock said cylinder in predetermined position. Simultaneously with the actuation of latch 121 by reason of the connection of the latter with latch 118, said latch will be also projected, or the curved extremity of said latch will be projected into notch 117 of the upper plate of the braking controller so that said controller will also be locked in off position.

When the operating drum is in normal off position and the reversing drum is in either a forward or a reverse position, actuation of the braking controller will operate the latches 118 and 124 respectively. As the upper latch 118 is moved by reason of its connection with latch 121, one extremity of the T head of said latch will be disengaged from the notch 123 in the upper plate 112 of the reverse cylinder, while the other extremity of said T head is projected into notch 122 in the main operating cylinder, thus locking the latter in a fixed position.

At the same instant that the upper latch 118 is actuated, the lower latch 124 has one extremity of its T head disengaged from the notch 126 of the lower plate 115 on the braking controller, while its other extremity is projected into one of the notches 125 in the lower plate 114 of the reversing controller dependent on the position of the latter.

When the braking controller is brought to the position 4$^b$, the notch in the upper plate 113 will be brought into alinement with the extremity of latch 118 so that the operating drum can be actuated for cutting out more of the series resistance at points 4, 5, 6, 7 and 8, and brought to the parallel position which is needed for bucking the motor for an emergency stop, as will be readily understood without further description.

From the foregoing, it will be seen that I have provided a quick and positive braking system and one which will at the same time give ample protection to the motors against injury from excessive currents by reason of the shunt paths across the series fields of the respective motors, which paths may be varied at will to maintain a maximum current for braking purposes when needed. Moreover, by my improved system of dynamic control, while the motor fields may be provided with shunt paths having therein more or less resistance to protect the motors, yet at the same time it leaves the original circuits with lower resistance so that the motors will build up quickly at comparatively slow speeds, thus enabling the vehicle to be held at a safe coasting speed if the same is descending a grade.

Although in the foregoing I have set forth certain elements which are thought best adapted to perform the functions allotted them, nevertheless it is to be understood that various minor changes as to form, substance, etc., may be resorted to within the scope of the appended claims.

I claim as my invention:

1. In an electrical braking system of the character described, the combination with a plurality of motors; of means for connecting said motors to act as generators, and additional means for simultaneously establishing shunt paths across the fields of said generators, some of said paths of each generator having unequal resistances therein, the resistances in the corresponding paths of said generators being equal to each other.

2. In an electrical braking system of the character described, the combination with a motor; of means for connecting the same to act as a generator, a shunt circuit across the field of said generator, said circuit having therein two breaks, means for closing one of said breaks in said shunt circuit, and additional means for closing the other break in said circuit substantially as and for the purpose set forth.

3. In an electrical braking system of the character described, the combination with a motor; of means for connecting the same to act as a generator, a shunt circuit of lower resistance extending across the field of said generator, a shunt circuit of higher resistance extending across the field of said generator, each of said circuits having therein two breaks, means for closing one break in each of said circuits, and additional means controlled by the generated energy of said generator to close the remaining breaks in said circuits substantially as and for the purpose set forth.

4. In an electrical braking system of the character described, the combination with a motor; of means for connecting the same to act as a generator, a plurality of shunt circuits extending across the field of said generator, each of said circuits having therein two breaks, a pair of electromagnets arranged in the circuit of said generator, means for closing one break in each of said shunt circuits, and a pair of circuit closing members adapted to close the remaining breaks in said shunt circuits, said members being controlled by said electromagnets substantially as and for the purpose set forth.

5. In an electrical braking system of the character described, the combination with a plurality of motors; of means for connecting the same to act as generators, a plurality of shunt circuits extending across the field of each of said generators and having therein two breaks, some of the shunt circuits of each generator having unequal resistances therein, the resistances in the corresponding shunt circuits of said generators being equal, means for simultaneously closing one break in each of said shunt circuits, a plurality of electromagnets arranged in the series circuit of said generators, switch members for closing the remaining breaks in said shunt circuits, said members being controlled by said electromagnets substantially as and for the purpose set forth.

6. In an electrical braking system of the character described, the combination with a plurality of motors; of means for connecting said motors to act as generators, a plurality of shunt paths across the field of each of said generators, each path having therein a resistance greater than that of its companion path, and means for simultaneously cutting out the paths of least resistance and including those of greatest resistance substantially as and for the purpose set forth.

7. In an electrical braking system of the character described, the combination with a source of supply, a plurality of motors and a running controller; of a braking controller, said braking controller including a plurality of coöperating contacts adapted when said braking controller is in off position to connect the fields of said motors and said running controller with said source of supply substantially as and for the purpose set forth.

8. In an electrical braking system of the character described, the combination with a source of supply, a plurality of motors adapted to be controlled thereby, and a running controller; of a braking controller coacting with said running controller, said braking controller including a plurality of coöperating contacts, certain of said contacts coacting when said braking controller is in off position to connect the field of said motors with said running controller, certain other of said contacts coöperating when the first referred to contacts are disengaged and said braking controller brought to one of its braking positions for connecting said motors to act as generators substantially as and for the purpose set forth.

9. In an electrical braking system of the character described, the combination with a plurality of motors, a source of supply and a running controller; of a braking controller coacting with said running controller, said braking controller having off and braking positions, means whereby when said braking controller is in off position, the fields of said motors will be connected with said source of supply in circuit with said running controller, and additional means whereby when said braking controller is in a braking position said source of supply is disconnected from said running controller and said motors connected to act as generators substantially as and for the purpose set forth.

10. In an electrical braking system of the character described, the combination with a plurality of motors and a running controller coöperating with the latter; of a braking controller coacting with said running controller, said braking controller having an off position and a plurality of braking positions, means on said braking controller for connecting said motors to act as generators when said controller is in its first braking position, and other means for simultaneously establishing a shunt path across the fields of each of said generators substantially as and for the purpose set forth.

11. In an electrical braking system of the character described, the combination with a plurality of motors and a running controller coacting with the latter; of a braking controller, the latter having a plurality of braking positions, means for connecting said motors to act as generators when said controller is in its first braking position, a plurality of shunt paths extending across the field of each of said generators and each having therein two breaks, some of said shunt paths having resistances therein, means whereby one break in each of said shunt paths may be closed when said controller is in its first running position, a plurality of electromagnets arranged in the series circuit of said generators, and a plurality of switches controlled by said electromagnets, each of said switches being adapted to close the remaining breaks in each of said circuits substantially as and for the purpose set forth.

12. In an electrical braking system of the character described, the combination with a plurality of motors and a series parallel running controller coöperating with the latter; of a braking controller coacting with said running controller and having a plurality of braking positions, a plurality of shunt paths across the field of each of said motors and each having therein two breaks, some of said paths having resistances therein, means for connecting said motors to act as generators and simultaneously closing one break in each of said shunt paths when said braking controller is moved to certain of its running positions, and additional means for closing the remaining breaks in each of said shunt paths substantially as and for the purpose set forth.

13. In an electrical braking system of the character described, the combination with a plurality of motors and a series parallel controller; of a braking controller coöperating with the latter, said braking controller having four braking positions, a plurality of shunt paths extending across the field of each of said motors, the paths across the respective fields having an increasing resistance, coöperating means for connecting said motors to act as generators and simultaneously closing the shunt paths of least resistance when said braking controller is in its first and second positions, and additional means for opening paths of least resistance and closing said paths of greatest resistance when said braking controller is in its third position substantially as and for the purpose set forth.

14. In an electrical braking system of the character described, the combination with a plurality of motors and a series parallel controller, the latter including a resistance coil and coacting therewith; of a braking controller coöperating with said series parallel controller, of a plurality of shunt paths across the field of each of said motors, the shunt paths of the respective fields having an increasing resistance, means for connecting said motors to act as generators and simultaneously permitting the current of the respective fields to follow certain of said paths dependent on the position of the braking controller, and additional means for discontinuing all of said shunt paths and excluding a portion of the resistance of said running controller substantially as and for the purpose set forth.

15. In an electrical braking system of the character described, the combination with a motor; of means for connecting the same to act as a generator, a variable resistance included in said means, means for varying said resistance, and additional means for simultaneously establishing a shunt circuit across the field of said generator substantially as and for the purpose set forth.

16. In an electrical braking system of the character described, the combination with a plurality of motors; of means for connecting the same to act as generators, a variable resistance included in the generator circuit of said motors, means for varying said resistance, and additional means for simultaneously establishing a shunt circuit across the fields of said generators substantially as and for the purpose set forth.

17. In an electrical braking system of the character described, the combination with a pair of motors; of a running controller, the latter having series and parallel positions, a braking controller having a plurality of braking positions, means controlled by said braking controller when the latter is in first braking position to connect said motors as generators, and additional means for establishing connections for bucking the motors when the braking controller is in its last braking position and said running controller is brought to parallel position, substantially as and for the purpose set forth.

In testimony whereof I have hereunto set my hand in presence of two subscribing witnesses.

JOHN T. SKINNER.

Witnesses:
C. F. MIKERELL,
G. R. SMITH.